United States Patent
Snelson

(10) Patent No.: US 10,339,337 B1
(45) Date of Patent: Jul. 2, 2019

(54) APPARATUS AND METHOD FOR SUPPLYING SECURE RELATIONAL QUERY RESULTS FROM A SEMI-STRUCTURED DOCUMENT DATABASE

(71) Applicant: MarkLogic Corporation, San Carlos, CA (US)

(72) Inventor: John Snelson, Oxford (GB)

(73) Assignee: MarkLogic Corporation, San Carlos, CA (US)

( * ) Notice: Subject to any disclaimer, the term of this patent is extended or adjusted under 35 U.S.C. 154(b) by 206 days.

(21) Appl. No.: 15/405,283

(22) Filed: Jan. 12, 2017

(51) Int. Cl.
*G06F 21/62* (2013.01)
*G06F 21/60* (2013.01)
*G06F 16/21* (2019.01)
*G06F 16/22* (2019.01)

(52) U.S. Cl.
CPC ........ *G06F 21/6227* (2013.01); *G06F 16/211* (2019.01); *G06F 16/2228* (2019.01); *G06F 21/604* (2013.01)

(58) Field of Classification Search
CPC .......... G06F 21/6227; G06F 17/30292; G06F 17/30321; G06F 21/604; G06F 16/2228; G06F 16/211
See application file for complete search history.

(56) References Cited

U.S. PATENT DOCUMENTS

| 6,085,198 | A | * | 7/2000 | Skinner | .................. | G06F 8/315 |
| 2005/0065942 | A1 | * | 3/2005 | Diab | ......................... | G06F 8/24 |
| 2014/0282910 | A1 | * | 9/2014 | Palmer | ............. | G06F 17/30575 726/4 |
| 2015/0058314 | A1 | * | 2/2015 | Leclerc | ............ | G06F 17/30575 707/711 |
| 2015/0154269 | A1 | * | 6/2015 | Miller | .................. | G06F 16/248 715/780 |

* cited by examiner

*Primary Examiner* — Kris E Mackes
*Assistant Examiner* — Lin Lin M Htay
(74) *Attorney, Agent, or Firm* — Cooley LLP

(57) ABSTRACT

An apparatus has a processor and a memory connected to the processor. The memory stores instructions executed by the processor to receive a relational query at a semi-structured document database. An access permissions index is looked-up for available documents for a user submitting the relational query. The relational query is resolved against relational schema within a relational schema index for the available documents to produce secure relational query results. The secure relational query results are supplied.

4 Claims, 3 Drawing Sheets

US 10,339,337 B1

APPARATUS AND METHOD FOR SUPPLYING SECURE RELATIONAL QUERY RESULTS FROM A SEMI-STRUCTURED DOCUMENT DATABASE

FIELD OF THE INVENTION

This invention relates generally to database administration. More particularly, this invention relates to techniques for supplying secure relational query results from a semi-structured document database.

BACKGROUND OF THE INVENTION

Semi-structured documents do not have a formal structure, but they do contain tags or other markers to separate semantic elements and enforce hierarchies of records and fields. Extensible Markup Language (XML) documents and JavaScript Object Notation (JSON) documents are examples of semi-structured documents. Different query tools are available for semi-structured document databases. For example, XML Path Language (XPath) is a query language for selecting nodes within an XML document. Nevertheless, many database administrators and users prefer the traditional relational database model and its popular query language, Structure Query Language (SQL).

Thus, it is desirable to augment the search capabilities associated with semi-structured document databases to include SQL queries. The SQL queries should enforce the same data access restrictions that are enforced by the semi-structured document database.

SUMMARY OF THE INVENTION

An apparatus has a processor and a memory connected to the processor. The memory stores instructions executed by the processor to receive a relational query at a semi-structured document database. An access permissions index is looked-up for available documents for a user submitting the relational query. The relational query is resolved against relational schema within a relational schema index for the available documents to produce secure relational query results. The secure relational query results are supplied.

An apparatus has a processor and a memory connected to the processor. The memory stores instructions executed by the processor to ingest and store within a semi-structured document database a semi-structured document with access permissions. An access permissions index entry is formed for the semi-structured document within an access permissions index. A relational schema index entry is formed for the semi-structured document within a relational schema index.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
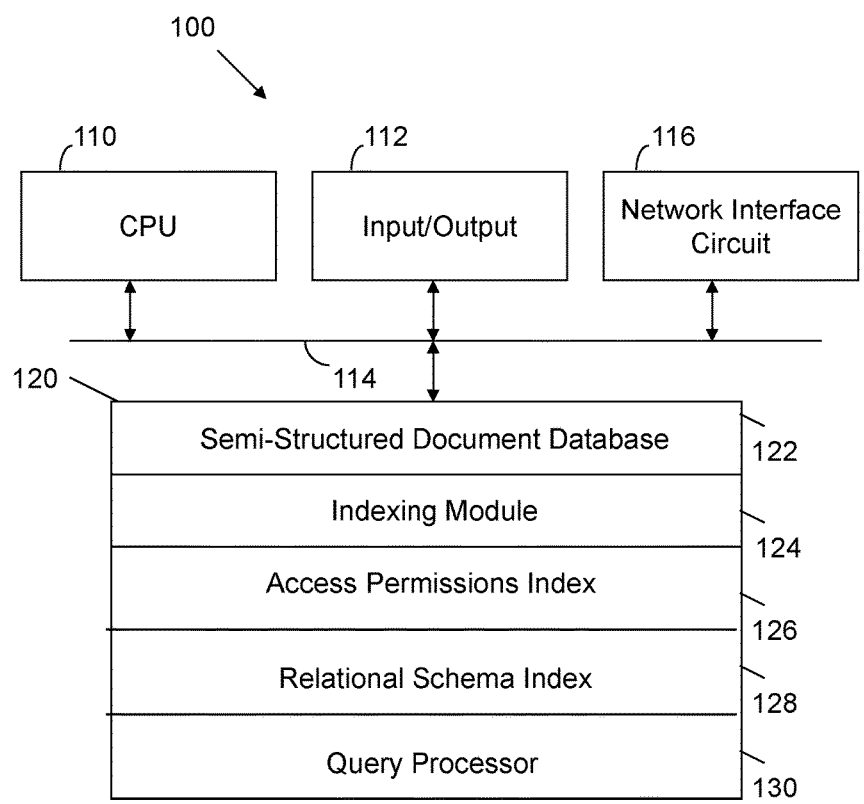
FIG. 1 illustrates a machine configured in accordance with an embodiment of the invention.

FIG. 1 illustrates a machine 100 configured in accordance with an embodiment of the invention. The machine 100 includes a central processing unit 110 connected to input/output devices 112 via a bus 114. The input/output devices 112 may include a keyboard, mouse, display and the like. A network interface circuit 116 is also connected to the bus 114. The network interface circuit 116 provides connectivity to a network, which may be any combination of wired and wireless networks. A memory 120 is also connected to the bus 114. The memory 120 stores a semi-structured document database 122. The semi-structured document database includes a collection of documents having semi-structured data. The term "document" as used herein is any type of semi-structured data segment.

The memory 120 also stores an indexing module 124. The indexing module 124 includes instructions executed by the central processing unit 110 to implement operations disclosed herein, including operations discussed in connection with FIG. 2. The indexing module 124 forms an access permissions index 126 and relational schema index 128. The query processor 130 includes instructions executed by central processing unit 110 to process a relational query against the access permissions index 126 and relational schema index 128 to produce secure relational query results, examples of which are supplied below.

Thus, the semi-structured document database 122 supports relational queries through utilization of the relational schema index derived from ingested semi-structured documents. Moreover, the security features associated with an individual document are incorporated into the relational query processing to supply secure relational query results.

Figure 2:
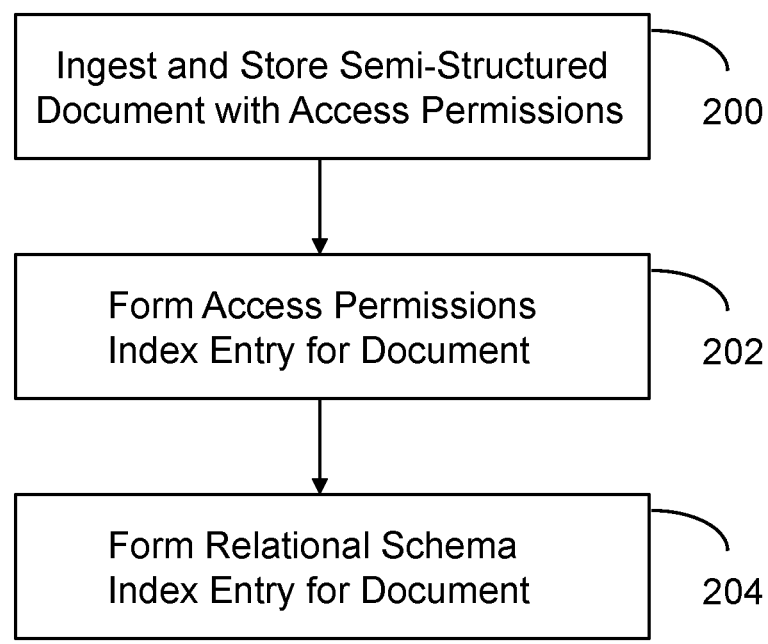
FIG. 2 illustrates processing operations associated with an indexing module utilized in accordance with an embodiment of the invention.

FIG. 2 illustrates processing operations associated with the indexing module 124. A semi-structured document with access permissions is ingested and stored 200. Consider the following two documents:

<doc><a>10</a><b>foo</b></doc>, read permission for role R, Document ID 1000

<doc><a>3</a><b>bar</b></doc>, read permission for roles R,S, Document ID 1001

An access permissions index entry is formed for each document 202. In this example, the two access permission index entries may be:

Read permission role R: 1000, 1001
Read permission role S: 1001

A relational schema index entry is formed for a document 204. In the context of the example above, a template is defined that specifies the element "doc" as the context of a row, and the contents of elements "a" and "b" as the values for columns "A" and "B". During indexing each document is matched against the template, and index entries are made for each column in each row. For the document above, that would be 10 in column "A", and "foo" in column B. Every index entry is stored alongside the document ID of the document where the row was extracted from. Example index entries for the documents above might be:

Row ID 0, Column A, 10, Document ID 1000
Row ID 0, Column B, foo, Document ID 1000
Row ID 1, Column A, 3, Document ID 1001
Row ID 1, Column B, bar, Document ID 1001

Thus, in an embodiment of the invention, the relational schema index includes individual entries specifying a row identification, a row value, a column identification, a column value and a document identification.

It should be appreciated that the operations 202 and 204 may be reversed. It should also be appreciated that the indexing module 124 may form a single universal index that incorporates the access permissions index 126 and the relational schema index 128.

Figure 3:
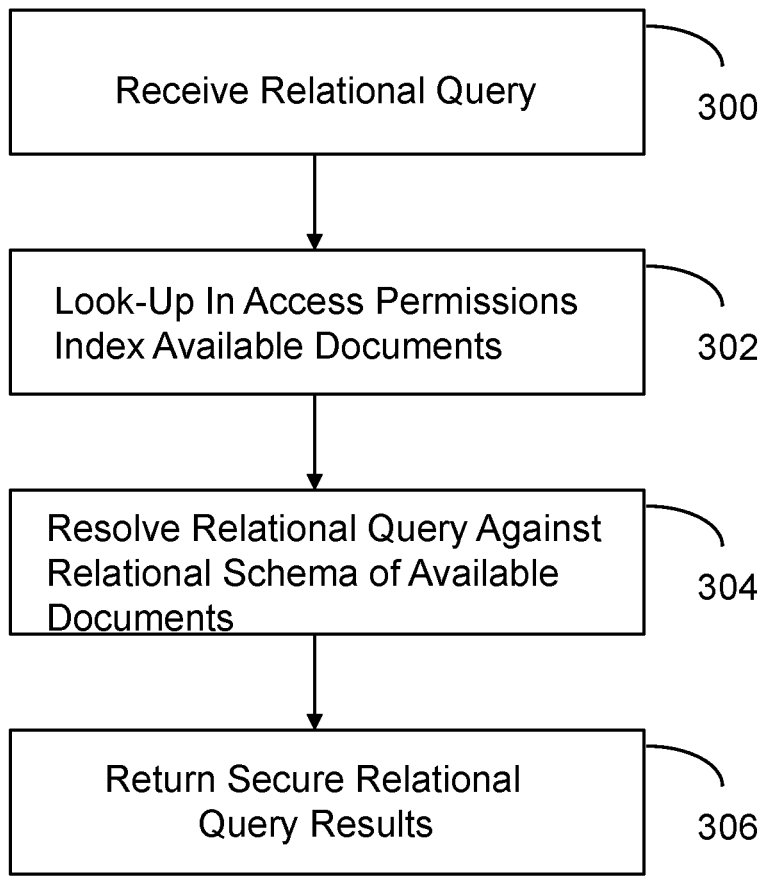
FIG. 3 illustrates processing operations associated with a query processor utilized in accordance with an embodiment of the invention.

FIG. 3 illustrates processing operations associated with an embodiment of the query processor 130. A relational query is received 300. Next, there is a look-up within the access permissions index for available documents for a user submitting the relational query 302. The relational query is then resolved against relational schema within the relational schema index for the available documents to produce secure relational query results 304. The secure relational query results are then returned 306.

Consider the case where a user who has role S issues a query for all rows from the table. The "Read permission role S" term is looked up in the index, which returns the Document ID list of all the documents readable by that role, which is [1001]. The index values for the table are read, but only the values with Document IDs in the list [1001] are returned, in this case:

Row ID 1, Column A, 3, Document ID 1001
Row ID 1, Column B, bar, Document ID 1001

If a user who has role R issues the same query, the "read permission role R" term returns the list [1000,1001], which following the same logic above returned all the entries from the index for the documents inserted.

Those skilled in the art will appreciate that in a relational database the information for a given entity is often spread amongst multiple tables. This makes it difficult to ensure the same access controls apply to all parts of the entity, as every table entry for the entity needs to have the same access control set. With the current invention, all rows extracted from the same document have the same access controls. This preserves the permissions from the source data. Thus, the invention solves the problem of how to query rows derived from document content, while respecting the access controls enforced on the original documents. Consequently, only one set of permissions needs to be set for an entity—on the document for that entity. This is a major strength of a document database, and is implicitly safer—there is reduced chance for user error because the database administrator does not need to protect rows in many tables.

This approach generalizes to other use cases where one first needs to limit the domain of rows (derived from documents) to be queried, before performing an arbitrary query over that domain to compute the results. One example of this technique is querying temporally controlled information, which also often more naturally relates to an entity (stored in a hierarchical document) rather than to the many relational tables necessary to store that entity. Other examples of such "contextual" information include both providence and confidence metadata. In other words, the relational schema index can be supplemented to include providence information and confidence metadata.

The apparatus of FIG. 1 is commonly utilized in a cluster of machines connected by a network that supports distributed processing. In such a configuration, a partition of a large semi-structured document database is hosted at each machine. The partition comprises a sub-set of the documents of the semi-structured document database and the corresponding segments of the access permissions index and relational schema index for the sub-set of documents. A distributed query against multiple nodes in the cluster may produce partial results that are combined at a master node.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An apparatus, comprising:
a processor; and
a memory connected to the processor, the memory storing instructions executed by the processor to:
ingest and store within a semi-structured document database a semi-structured document with access permissions,
form an access permissions index entry for the semi-structured document within an access permissions index,
form a relational schema index entry for the semi-structured document within a relational schema index;
and resolve a relational query against the semi-structured document database utilizing the access permissions index and the relational schema index, wherein the memory storing instructions executed by the processor to resolve the relational query include instructions to:
look-up within the access permissions index available documents for a user submitting the relational query,
resolve the relational query against relational schema within the relational schema index for the available documents to produce secure relational query results, and
supply the secure relational query results.

2. The apparatus of claim 1 wherein the available documents for the user submitting the relational query are based upon a role of the user submitting the relational query.

3. The apparatus of claim 1 wherein the access permissions index includes individual entries specifying a list of documents available for a read permission role.

4. The apparatus of claim 1 wherein the relational schema index includes individual entries specifying a row identification, a row value, a column identification, a column value and a document identification.

* * * * *